United States Patent [19]
Sorenson et al.

[11] 3,788,416
[45] Jan. 29, 1974

[54] HIGH-CLEARANCE AGRICULTURAL VEHICLE

[75] Inventors: Charles E. Sorenson; Jon M. Grimmer, both of Evansville, Ind.

[73] Assignee: Hahn, Inc., Evansville, Ind.

[22] Filed: May 26, 1972

[21] Appl. No.: 257,137

[52] U.S. Cl............... 180/27, 180/54 A, 180/68 R, 180/69 R, 180/72, 180/89 R, 280/34 R, 280/106
[51] Int. Cl............................................ B62d 61/08
[58] Field of Search... 180/27, 1 F, 54 A, 68 R, 180/69 R, 72, 25 R, 26 R, 89 R; 280/32.5, 280/106, 34 R

[56] References Cited
UNITED STATES PATENTS

| | | | |
|---|---|---|---|
| 2,985,379 | 5/1961 | Strickland | 239/172 |
| 1,681,426 | 8/1928 | Nichols | 180/27 |
| 3,438,454 | 4/1969 | Rickel et al. | 180/27 |
| 2,504,403 | 4/1950 | Finley | 180/1 F |
| 2,048,959 | 7/1936 | Thompson | 180/68 R |
| 3,217,823 | 11/1965 | Balthes | 180/27 |
| 3,154,164 | 10/1964 | Shaw et al. | 280/34 R |

*Primary Examiner*—David Schonberg
*Assistant Examiner*—John P. Silverstrim
*Attorney, Agent, or Firm*—Hood & Coffey

[57] ABSTRACT

A high-clearance agricultural vehicle of the type used generally for spraying and otherwise treating row crops which grow to considerable height comprising a main frame extending longitudinally from the front to the rear of the upper portion of the vehicle, a pair of rear drive wheels disposed on opposite sides of and connected to the rear portion of the frame, a tank suspended from the frame to be disposed laterally between the rear wheels, a front wheel connected to the forward portion of the frame to be pivotally movable about a steering axis, an engine supported under the frame to be forwardly of the tank and behind the front wheel, and a transmission and axle assembly drivingly connecting the engine to the rear wheels. The main frame is defined by a pair of laterally spaced apart, longitudinally extending side members as the primary structural members. These members are formed to provide, above the engine, a cockpit for the operator of the vehicle, the rear portions of the members being laterally spaced apart by a distance approximately equal to the width of the tank. Each rear wheel is journal mounted by means of a yoke which is laterally adjustable relative to the frame. The engine is liquid cooled, and the radiator for the engine is disposed above the engine and in front of the cockpit in the frame. The fan associated with the radiator draws cooling air in from the side panels adjacent the engine and upwardly through the radiator and out through a grillwork in front of the radiator.

12 Claims, 4 Drawing Figures

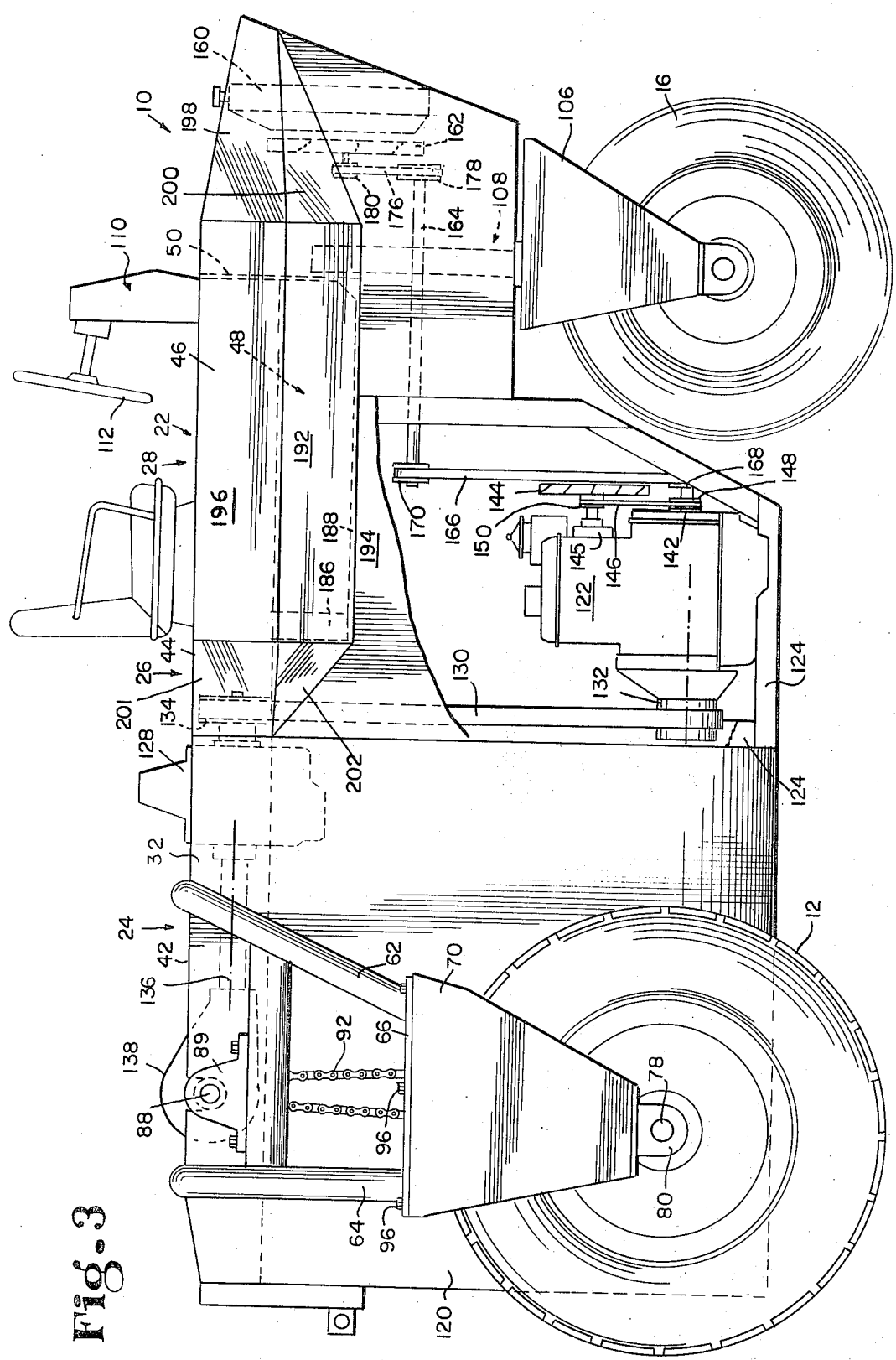

HIGH-CLEARANCE AGRICULTURAL VEHICLE

It is an object of the present invention to provide a high-clearance agricultural vehicle, the main frame of which is formed with an enlargement providing a cockpit for the operator of the vehicle, the cockpit being disposed above the engine. The engine is preferably liquid cooled, and the radiator for cooling the engine is disposed above the engine and forwardly of the cockpit. The two rear wheels are journal mounted by yokes which are selectively laterally adjustable relative to the frame.

High-clearance agricultural vehicles for use in spraying or otherwise treating row crops which grow high have been in use for many years. The design and development and use of these vehicles presents many problems which heretofore have not been satisfactorily solved. The main frame of the vehicle must be extremely high and quite narrow, and the necessary equipment, such as the tank, must be disposed below the main frame and confined to the width of the main frame to pass between the rows of a crop. Such vehicles have generally included two rear wheels and a centrally located front wheel, the rear wheels being supported by means laterally spaced from the main frame so that a row of crop can pass between the tank supported below the main frame and each wheel.

Conventionally, the main frame has been provided by a pair of laterally spaced apart, longitudinally extending parallel pipe members as the primary structural members of the main frame. The support structure for the engine, tank, wheel supports, and the like, have been welded to these pipe members. Because of the narrow width requirements, it has been necessary to provide a position for the operator of the vehicle above the main frame. This places the operator in a position where he does not have a satisfactory feeling of control and stability.

The present invention is an improvement over the prior art devices because the main frame is provided with an enlargement in its forward portion providing a cockpit for the operator of the vehicle. This enlargement is located and proportioned and designed so that it will move through tall row crops without damaging them. The enlargement for the cockpit is disposed above the engine which provides a considerable portion of the mass of the vehicle. The placement of the cockpit within the frame lowers the center of gravity of the vehicle and gives the operator greater feeling of control and stability. The cockpit disposed in this manner protects the operator by keeping him as low as possible.

The main frame of the vehicle of the present invention is preferably formed from a pair of inwardly facing channel members instead of the usual pipe and gusset frame members. The weight to strength ratio of the channel members is greater than it is with the conventional pipe and gusset frame members, and the flat surface of the channel members facilitate mounting of the other components of the vehicle.

The rear drive wheels of the vehicle of the present invention are preferably mounted on yokes which are selectively laterally adjustable relative to the main frame to accommodate different crop row widths. Each yoke includes a base and laterally spaced apart downwardly extending flanges on opposite sides of a rear wheel with a trunnion supported by the flanges journal mounting the wheel.

The engine of the vehicle of the present invention is preferably liquid cooled, and the radiator for cooling the engine is placed well above the engine and forwardly of the cockpit of the vehicle. Enclosure means is suspended from the forward portion of the main frame to enclose the engine, this enclosure means providing ventilation openings at each side adjacent the engine. A fan is disposed adjacent the radiator to draw air through the ventilation openings and upwardly through the radiator and force it out through the front of the vehicle. One object of the present invention is to keep the radiator in a position such that it is disposed upwardly and away from the dirt and debris generated at the lower levels and particularly the dirt and debris kicked up by movement of the front wheel. By drawing the cooling air from the side walls of the enclosure for the engine and forcing it upwardly and out through the front of the vehicle, the heat of the engine compartment is drawn away from the cockpit area where the operator resides.

Other objects and features of the present invention will become apparent as this description progresses.

To the accomplishment of the above and related objects, this invention may be embodied in the form illustrated in the accompanying drawings, attention being called to the fact, however, that the drawings are illustrative only and that change may be made in the specific construction illustrated and described, so long as the scope of the appended claims is not violated.

In the drawings:

FIG. 3 is a fragmentary and partially cut away elevation view of the vehicle of the present invention.

Figure 1:
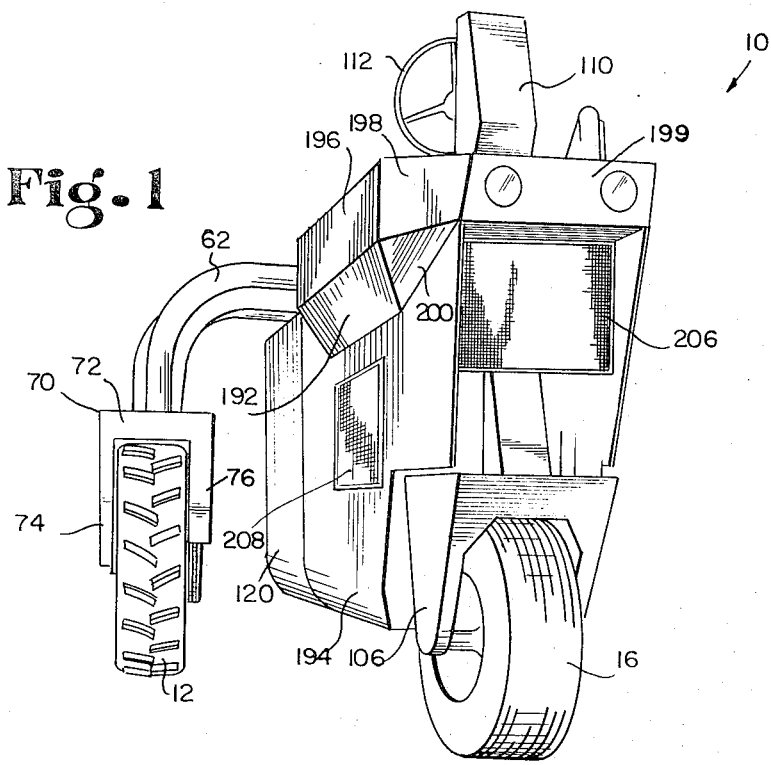
FIG. 1 is a perspective view of the vehicle of the present invention.

Referring now to the drawings, it will be seen that the vehicle, indicated generally by the reference numeral 10, comprises a pair of rear drive wheels, only one wheel 12 being shown, and a front wheel 16. The front wheel 16 is centrally located at the front of the vehicle 10, and the two rear wheels are laterally spaced apart from the rear portion of the vehicle.

The vehicle 10 comprises a main frame 22 extending longitudinally from the front to the rear of the upper portion of the vehicle, the main frame having a rear portion 24, intermediate portion 26 and forward portion 28. From the drawings, it will be appreciated that the main frame 22 is defined by a pair of laterally spaced apart, longitudinally extending side members 30, 32 as the primary structural members, these side members preferably being channel members. Each channel member 30, 32 conventionally has a vertically extending web portion and upper and lower inwardly extending flange portions.

Figure 2:
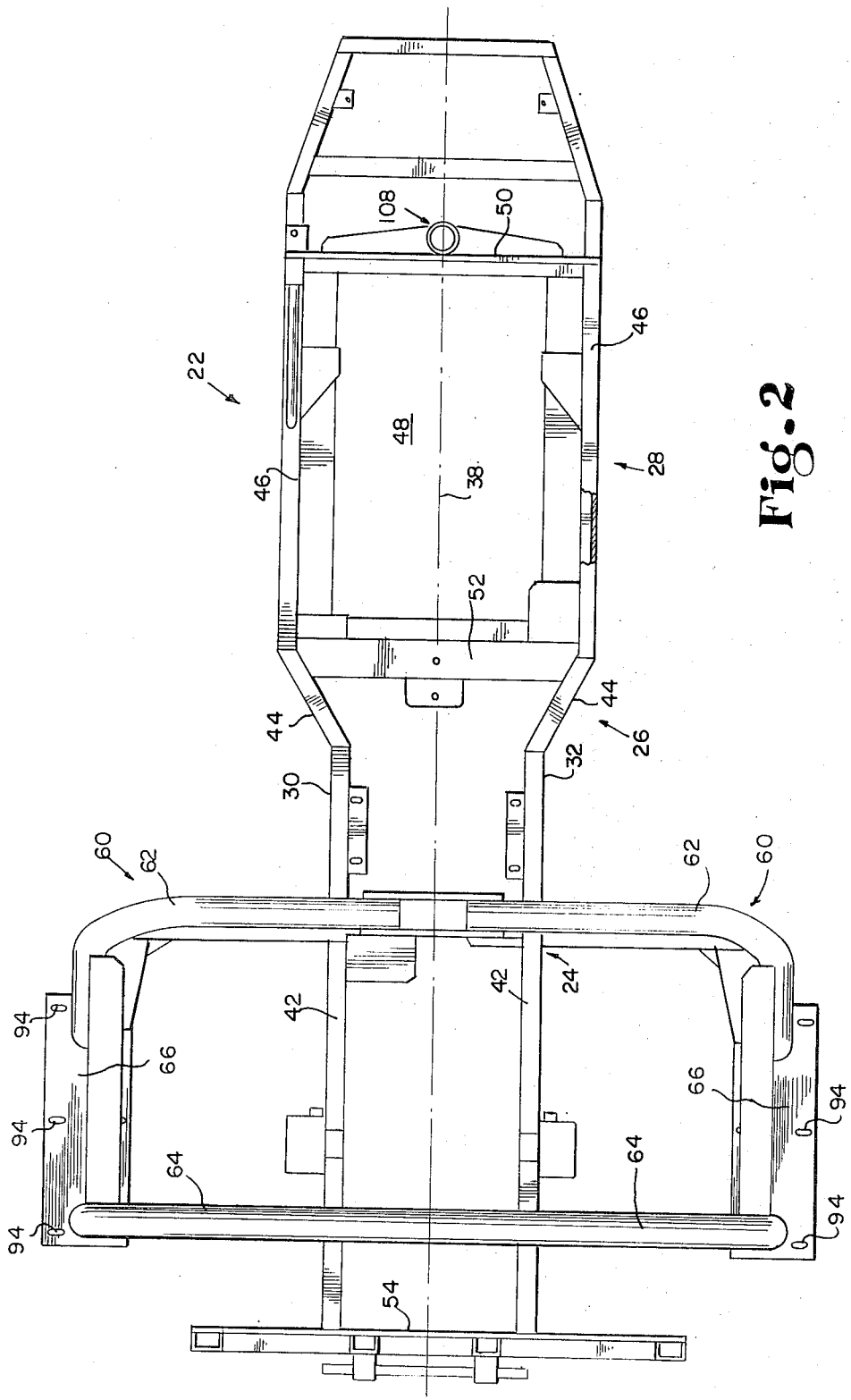
FIG. 2 is a top view of the main frame assembly of the vehicle of the present invention.

As clearly seen in FIG. 2, the side members 30, 32 (channel members) are generally symmetrically formed and laterally spaced apart relative to a vertically and longitudinally extending center plane of the vehicle 22, the plane being defined in FIG. 2 by the reference numeral 38. In other words, each channel member 30, 32 is allochirally related to the other channel member.

Further, from FIG. 2, it will be seen that the portions 42 of the channel members 30, 32 defining the rear portion 24 of the frame 22 are generally parallel and spaced apart by a first distance, the portions 44 of the said members defining the intermediate portion 26 are inclining laterally outwardly and forwardly, and the portions 46 of the said members defining the forward portion 28 are generally parallel and spaced apart a second and greater distance to provide a cockpit 48 for the operator therebetween.

Of course, the two channel members 30, 32 are rigidly connected together by cross plates and cross members such as the front cross plate 50, middle cross plate 52 and rear cross plate 54. Further, the two channel members are rigidly secured together by the means 60 for mounting each rear wheel, the means including a pipe formed to extend across the frame 22 to provide front support arms 62 and another such pipe formed to extend across the frame to provide the rear support arms 64. Each arm extends outwardly and downwardly from the rear portion 24 as illustrated. A mounting bracket or plate 66 is welded or otherwise rigidly secured to the distal ends of the arms 62, 64.

Figure 4:
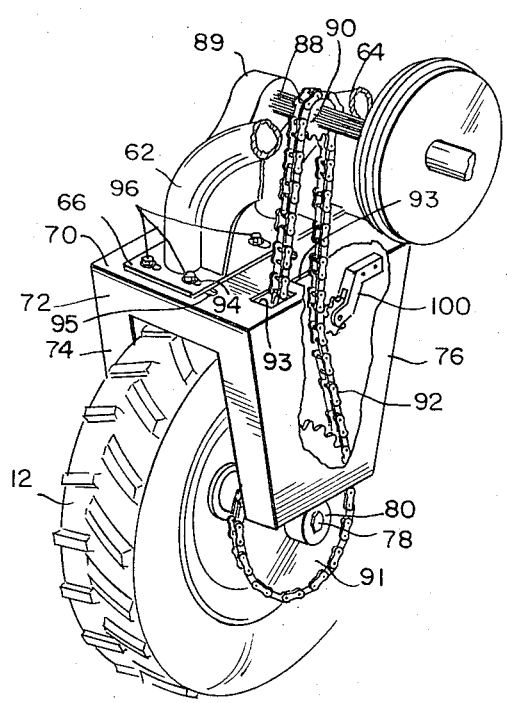
FIG. 4 is a fragmentary perspective view, partially cut away, of a rear drive wheel and the manner in which it is mounted for selectively lateral adjustment on the vehicle.

Each rear wheel is journal mounted by means of a yoke 70 formed to provide a yoke base 72 and downwardly extending, laterally spaced apart vertical flanges 74, 76 on opposite sides of the wheel. A trunnion 78 is mounted on the lower ends of these flanges 74, 76 by means indicated at 80 to journal mount the wheel therebetween. As clearly shown in FIG. 4, a splined axle 88 extends laterally outwardly from the frame 22. The distal end of this axle 88 is journal mounted by means of a bearing mount 89 rigidly supported by the arms 62, 64. The axle 88 is drivingly connected to the wheel 12 by means including a sprocket 90 on the axle, a sprocket 91 concentric with and drivingly connected to the wheel 12, and a chain 92 trained about the sprockets. The chain 92 passes through openings 93 in the base 72 of the yoke 70.

The upper sprocket 90 is axially shiftable on the splined axle 88 to accommodate the lateral positioning of the wheel 12 and its sprocket 91. The wheel 12 and its sprocket 91 are laterally adjustable by shifting the yoke 70 relative to the arms 62, 64. Particularly, the bracket plate 66 provides a downwardly facing horizontally extending surface and the yoke 70 base provides an upwardly facing, horizontally extending surface in engagement with the downwardly facing surface. The length and width of these surfaces are sufficient to provide a stable secure connection of the yoke 70 to the bracket plate 66. In the illustrative embodiment, the bracket plate 66 is provided with laterally elongated slots 94 and the yoke 70 base is provided with registering laterally elongated slots 95. The yoke is secured to the bracket plate 66 by means of bolts 96 which extend through these slots. Lateral adjustment of the yoke to accommodate different row widths is accomplished by loosening the bolts 96 and shifting the yoke laterally to the desired position and then tightening the bolts. The amount of adjustment, of course, is determined by the length of the slots 94, 95. Of course, the lateral position of the sprocket 90 is adjusted on the axle 88 so that it is in perfect alignment with the sprocket 91. A take-up idler sprocket such as indicated at 100 may be used for providing the proper tension on the chain 92.

It will be appreciated that, in the illustrative and preferred embodiment, a yoke 106 provides a trunnion support for the front wheel 16. A steering column indicated generally at 108 connects the yoke 106 to the forward portion of the main frame 22 for pivotal movement about a steering axis lying generally in the said center plane of the vehicle, i.e., the vertical plane represented by the center line 38 in FIG. 2. Above the frame 22 and in front of the cockpit 48 is a steering control box 110 from which the steering wheel 112 is supported. Contained inside this control box 110 is a conventional and commercially available hydraulic control system for a power steering mechanism including a hydraulic cylinder for moving the steering column about its axis to steer the front wheel 16.

Conventionally, such vehicles 10 carry a large tank for storing liquid material to be sprayed upon crops. Such a tank 120 is suspended from the rear portion 24 of the main frame 22 with the tank having a lateral width generally equal to the said first distance, i.e., the width of the rear portion 24. The tank 120 is preferably generally U-shaped in longitudinal cross section with its upwardly extending side walls being secured, at their upper edges, respectively to the outside surfaces of the portions 42 of the channel members 30, 32.

As best seen in FIG. 3, an engine 122 is mounted below the forward portion 28 of the main frame 22 by frame members, such as indicated at 124 connected to the frame 22. Preferably, the engine 122 is a liquid-cooled reciprocating engine of the type including a crankshaft, and the rotational axis of the crankshaft is preferably parallel to and closely adjacent to or lying in said center plane of the vehicle. A transmission 128 is disposed generally within the confines of the main frame 22 just to the rear of the intermediate portion 26. This transmission 128 is drivingly connected to the engine 122 by belt means 130 trained about pulley means 132 on the rear output shaft of the engine and pulley means 134 on the forwardly extending input shaft of the transmission 128. A drive shaft 136 drivingly connects the transmission 128 to a rear axle assembly 138 which provides the splined axle ends 88 discussed in conjunction with FIG. 4.

An output shaft 142 for the engine 122 is illustrated in FIG. 3. This shaft 142 may be mounted on the crankshaft or drivingly connected to the crankshaft of the engine. A conventional fan 144 may be journal mounted on the upper portion of the engine by conventional means such as the illustrated water pump 145. This fan 144 is drivingly connected to the output shaft 142 by a belt 146 trained about a pulley 148 on the output shaft and another pulley 150 on the fan 144.

A radiator 160 for cooling the engine 122 is mounted in a chamber disposed above the engine 122 and front wheel 16 and in front of the cockpit 48 and steering column 108. Behind this radiator 160 is journal mounted a conventional automotive fan 162. This fan 162 is drivingly connected to the output shaft 142 by a jack shaft 164 journal mounted for rotation in the vehicle and extending from the upper portion of the engine compartment to the said radiator chamber. A belt 166 is trained about a pulley 169 on the output shaft 142 and another pulley 170 on the rear end of the shaft 164 to drive the shaft. Another belt 176 is trained about a pulley 178 on the forward end of the jack shaft 164 and a pulley 180 on the fan 162 to drive the fan 162 from the jack shaft. The jack shaft 164 is preferably parallel to the said center plane of the vehicle and laterally spaced apart therefrom to pass the steering column 108.

The vehicle of the present invention comprises means for enclosing the engine compartment and the radiator chamber with the enclosure means being formed such that it will move through the higher crops without damaging them. The enclosure means depends from the enlarged forward portion 28 of the main frame 22 to enclose the engine 122, the enclosure means including opposing side wall means having upper side panels 196 covering the channel portions 46, upper side portions 192 extending downwardly from the channel portions 46 to a point above the engine, and lower side portions 194 extending respectively downwardly from the upper side portions 192 to a point below the engine. An engine compartment floor plate, not shown, extends between the lower edges of the lower portion to close the compartment. The lateral distance between the lower side portions 194 is generally equal to the said first distance, i.e., the width of the tank 120, so that the enclosure means will pass between the crop rows. In the illustrative and preferred embodiment, the upper portions 192 incline downwardly and inwardly from the portions 46 of the channel members 30, 32 defining the forward portion 28 to the upper edges, respectively, of the lower side portions.

The side wall means of the enclosure extend forwardly of the steering column 108 to provide, above the front wheel 16 and forwardly of the cockpit 48, the said radiator chamber which is in communication with the portion of the enclosure means enclosing the engine 122. The front wall means of this radiator chamber may be a screen-type grill such as indicated at 206 so that air moving through the radiator can pass therethrough. Adjacent the engine, the wall portions 194 are provided with openings closed by doors 208 providing screen-type grills so that air can circulate therethrough.

In the illustrative and preferred embodiment, the fan 162 is driven to force air forwardly out through the radiator and the front of the radiator chamber. This fan draws air in through the ventilation openings in the side doors 208.

The movement of the enlargement in the frame 22 providing the cockpit 48 through the crops is facilitated by panels such as indicated at 198 in FIG. 1 which incline forwardly and inwardly from the panels 196 to the front panel 199; triangular panels such as indicated at 200 in FIG. 1 which incline forwardly, inwardly and upwardly from the upper side portions 192 to the front panel 199; panels such as indicated at 201 in FIG. 3 inclining inwardly from the rear ends of panels 196 and generally parallel to channel portions 44; and triangular panels such as indicated at 202 which incline rearwardly, inwardly and upwardly from the upper side portions 192. The front panel 199 is generally of the same width as the tank 120.

What is claimed is:

1. A high-clearance agricultural vehicle comprising a main frame extending longitudinally from the front to the rear of the upper portion of said vehicle, said main frame having a rear portion, intermediate portion and forward portion, said main frame being defined by a pair of laterally spaced apart, longitudinally extending side members as the primary structural members, said side members being generally symmetrically formed and laterally spaced apart relative to a vertically and longitudinally extending center plane of said vehicle, the portions of said side members defining said rear portion being generally parallel and spaced apart by a first distance, the portions of said side members defining said intermediate portion inclining laterally outwardly and forwardly, and the portions of said side members defining said forward portion being generally parallel and spaced apart a second and greater distance to provide a cockpit for the operator therebetween, a pair of rear wheels, means for mounting said rear wheels extending outwardly and downwardly from each side of the rear portion of said main frame, a front wheel, a trunnion support for journal mounting said front wheel, a steering column for connecting said trunnion support to the forward portion of said main frame for pivotal movement about a steering axis lying generally in said center plane, a tank having a width generally equal to said first distance depending from the rear portion of said main frame and disposed axially between said rear wheels, an engine supported under the forward portion of said main frame, an axle assembly supported on the rear portion of said main frame, transmission means supported on said main frame and drivingly connected said engine and said axle assembly, means for drivingly connecting said axle assembly to said rear wheels, enclosure means depending from the forward portion of said main frame to enclose said engine, said enclosure means including opposing side wall means having upper side portions extending downwardly from said forward portion to a point above said engine and lower side portions extending respectively downwardly from said upper side portions to a point below said engine, the distance between said lower side portions being generally equal to said first distance.

2. The vehicle of claim 1 in which said side wall means extend forwardly of said steering column to provide, above said front wheel and forwardly of said cockpit, a chamber in communication with the portion of said enclosure means enclosing said engine, and including front wall means for said chamber disposed between said side wall means and constructed to permit air flow therethrough, radiator means disposed in said chamber for cooling said engine, and fan means disposed in said chamber for moving air through said radiator means.

3. The vehicle of claim 2 in which said side wall means provide ventilation openings adjacent said engine, said fan means being disposed to draw air into said enclosure means through said ventilation openings and to move it through said radiator and out through said front wall means.

4. The vehicle of claim 3 in which said engine has a crankshaft and including means for drivingly connecting said fan means to said engine comprising jack shaft means journal mounted in said enclosure means above the crankshaft of said engine and extending forwardly into said chamber, pulley and belt means for drivingly connecting the rear end of said jack shaft means to the crankshaft of said engine and second pulley and belt means for drivingly connecting the forward end of said jack shaft means to said fan means.

5. The vehicle of claim 4 in which the axis of the crankshaft lies generally in said center plane and the axis of said jack shaft means is generally parallel to and spaced apart from said center plane to pass said steering column.

6. The vehicle of claim 1 in which said engine is a water-cooled engine and including means providing a chamber above said front wheel and forwardly of said cockpit, radiator means disposed in said chamber for cooling said engine, and fan means disposed in said chamber for moving air through said radiator means.

7. The vehicle of claim 1 in which each said means for journal mounting one of said rear wheels includes a yoke providing a base and laterally spaced apart flanges extending downwardly from said base, said rear wheel being disposed between said flanges, a trunnion carried by said flanges for journal mounting said wheel, rigid support arm means extending outwardly and downwardly from said rear portion, mounting bracket means carried by the distal end of said arm means, and means for connecting said yoke base to said mounting bracket means for selectively adjustable lateral movement.

8. The vehicle of claim 7 in which said mounting bracket means includes a laterally and horizontally extending plate providing a downwardly facing surface, said yoke base providing a horizontally extending upwardly facing surface engaging said downwardly facing surface, said connecting means including fastening elements penetrating said surfaces.

9. A high-clearance agricultural vehicle comprising a main frame extending generally horizontally and longitudinally from the front to the rear of the upper portion of said vehicle, said main frame having a rear portion, intermediate portion and forward portion, said main frame being defined by a pair of laterally spaced apart, longitudinally extending channel members as the primary structural members, said channel members being allochirally formed and arranged to have generally vertically extending vertical webs and upper and lower extending flanges, the portions of said channel members defining said rear portion being generally parallel and spaced apart by a first distance, the portions of said channel members defining said intermediate portion inclining laterally outwardly and forwardly, and the portions of said channel members defining said forward portion being generally parallel and spaced apart a second and greater distance to provide a cockpit for the operator therebetween, rear drive wheels disposed on opposite sides of said rear portion, means for mounting each said rear wheel extending outwardly and downwardly from the adjacent side of said rear portion, a front wheel, a trunnion support for journal mounting said front wheel, a steering column for connecting said trunnion support to the forward portion of said main frame for pivotal movement about a steering axis, an engine supported under the forward portion of said main frame to be under said cockpit, enclosure means depending from said forward portion to enclose said engine, said enclosure means including opposing side wall means having lower side portions on opposite sides of said engine, the distance between said lower side portions being generally equal to said first distance.

10. The vehicle of claim 9 in which said opposing side wall means include upper side portions extending respectively upwardly and outwardly from the upper edges of said lower side portions to said portions of said channel members defining said forward portion.

11. The vehicle of claim 10 in which said upper side portions include respectively forward portions inclining inwardly and forwardly to a width generally equal to said first distance and rear portions inclining inwardly and rearwardly to said width.

12. A high-clearance agricultural vehicle comprising a main frame extending generally horizontally and longitudinally from the front to the rear of the upper portion of said vehicle, said main frame having a rear portion, intermediate portion and forward portion, said main frame being defined by frame members proportioned and designed such that said rear portion is of a first lateral width and said forward portion is of a second and greater lateral width to provide a cockpit for the operator therebetween, a tank centrally supported under said rear portion, said tank having a width generally equal to said first width, rear drive wheels disposed on opposite sides of said tank, means for mounting each said rear wheel extending outwardly and downwardly from the adjacent side of said rear portion, a front wheel, a trunnion support for journal mounting said front wheel, a steering column for connecting said trunnion support to the forward portion of said main frame for pivotal movement about a steering axis, an engine supported under the forward portion of said frame to be under said cockpit, enclosure means depending from said forward portion to enclose said engine, said enclosure means including opposing side wall means having lower side portions on opposite sides of said engine, the distance between said lower side portions being generally equal to said first width.

* * * * *